Dec. 3, 1946.  O. A. HANSEN  2,412,146
TRANSPORT VEHICLE FOR LIQUEFIED GAS
Filed April 16, 1943
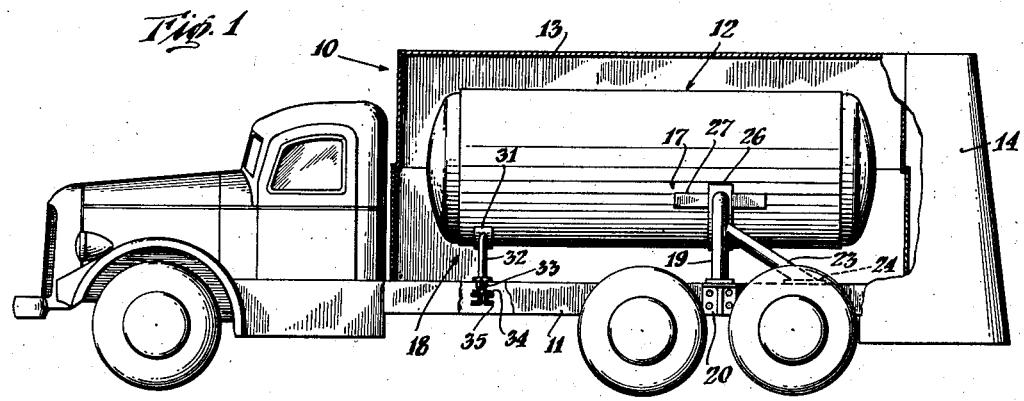
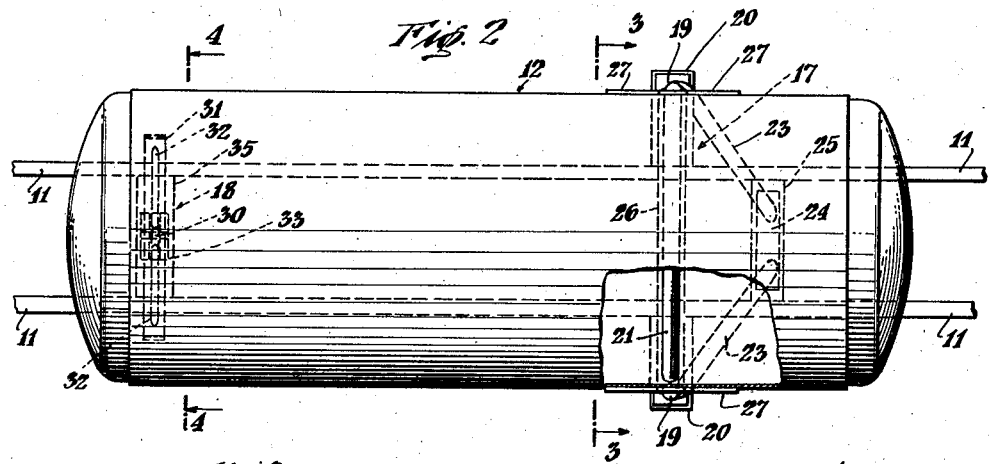
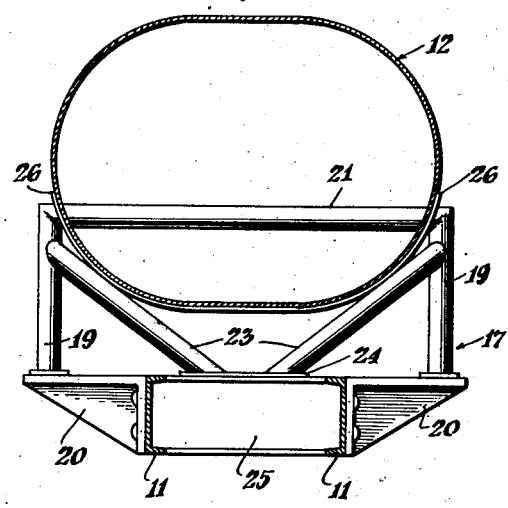
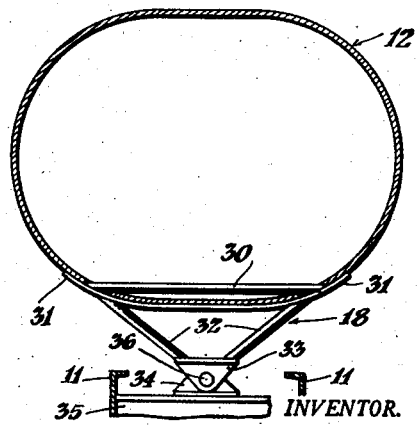
INVENTOR.
Odd A. Hansen
BY
Watson, Bristol, Johnson & Leavenworth
ATTORNEYS Patented Dec. 3, 1946

2,412,146

UNITED STATES PATENT OFFICE 2,412,146

TRANSPORT VEHICLE FOR LIQUEFIED GAS

Odd A. Hansen, Kenmore, N. Y., assignor to The Linde Air Products Company, New York, N. Y., a corporation of Ohio Application April 16, 1943, Serial No. 483,254

11 Claims. (Cl. 280—5)

The invention relates to a vehicle tank construction, such as a motor vehicle adapted to transport highly volatile liquefied gases such as particularly liquid oxygen. It is concerned with the provision of a support for the tank which is strong for its weight and remains so under the low temperatures to which it is subjected, functions to avoid or reduce to a low value the production of stresses in the tank from deflections or twisting of the vehicle frame, and restricts to a low value the heat leakages therethrough into the tank.

The arrangement comprises in general a substantially three-point compression type of suspension embodying a main supporting means with two upright spaced posts, and an auxiliary V-shaped support, the apex of the latter having a hinge connection to the frame. In the main supporting means the two posts are quite widely spaced, each being provided with a brace, the two braces together forming a V with the legs converging from the top of the posts inwardly and downwardly and away from the plane of the posts. The main supporting means, therefore, not only assumes the major part of the vertical load but also takes the forward and back reactions and, for the most part, the side reactions. The auxiliary support having a single hinged connection to the frame is required to supply little more than a third point of support for the vertical load, and, by appropriate selection of the locations of the respective supports relative to the center of gravity of the tank, the vertical load at this point is made relatively light.

The supporting means are in general of a character such as to be relatively unaffected in strength by the extremely low temperatures to which they are subjected and to present a path of high resistance to heat transfer into the tank and its contents. To these ends the supporting members are made of a material which remains tough at low temperatures and possesses a low heat conductivity, the latter property being enhanced by making the supporting members of a long tubular construction.

The supporting structures are secured to the tank in a manner such as to be a rigid part thereof but adapted to distribute the supporting stress over areas of considerable extent. The arrangement in general has the further advantages of a simple structure capable of ready assembly by welding operations.

Other objects of the invention will in part be obvious and will in part appear hereinafter.

The invention accordingly comprises the features of construction, combination of elements, and arrangement of parts, which will be exemplified in the construction hereinafter set forth, and the scope of which invention will be indicated in the claims.

For a fuller understanding of the nature and objects of the invention reference should be had to the following detailed description taken in connection with the accompanying drawing, in which:

Fig. 1 is a general view in elevation of a motor vehicle with certain parts broken away to show more clearly features of the invention;

Fig. 2 is a plan view of the tank and its immediate supports with a portion of the tank broken away;

Fig. 3 is a cross-sectional view taken on the line 3—3 of Fig. 2; and

Fig. 4 is a cross-sectional view taken on the line 4—4 of Fig. 2.

The vehicle may be any one of various conventional forms comprising either a single main truck or a trailer type, but as shown in a general way it comprises a unitary truck 10 with the usual chassis having a pair of side rails 11. Mounted longitudinally on the truck is a liquid container 12 of considerable capacity, generally oblong in shape, which may vary as to details, dependent upon the purposes, but in the illustration is intended to be used for the transport of liquid oxygen.

Surrounding the tank is an outer shell 13 of sheet metal which provides an intervening space between it and the tank, which may be utilized for insulating purposes as, for example, a filling of powdered magnesium carbonate. The outer shell may include, if desired, a rear compartment 14 adapted to house various controls and equipment, including pumping apparatus, where that comprises a part of the mobile unit. Details of these features are omitted in the interest of clarity since they form no particular part of the present invention.

The support for the tank 12 comprises a main supporting means indicated generally at 17 and an auxiliary supporting means indicated generally at 18. The main supporting means 17 is located at the rear and will normally be positioned near the rear axle assembly. With a dual rear axle the rear supporting means is preferably located between the two axle assemblies as shown in Fig. 1. The arrangement in general is also adapted to use on a trailer or semi-trailer. The elements of the main supporting means 17 include two upright main posts 19, each supported on an outrigger bracket 20 secured to the respective side rails 11 of the vehicle frame. The upper ends of the posts 19 are connected to a cross member 21 which passes completely through the tank 12. Each of the posts 19 is provided with an angular brace 23 which extends from near the top of the respective post downwardly and inwardly toward the longitudinal center line of the vehicle and also away from the plane of the posts. The two braces together form a substantially V-arrangement, and the lower ends are welded to a common plate 24 which in turn is secured to a rigid strong cross beam or member 25 secured between the two side rails 11. The fabrication of the supporting structure may conveniently be by way of welding, that is, the adjoining ends of each upright post 19 and the cross member 21 are welded together and the upper end of the brace 23 is welded to the post 19, and likewise the lower ends of the braces 23 are welded to the plate 24.

Each of the supporting members 19, 21 and 23 is of tubular construction and the members 19 and 23 are of considerable length. Each member is composed of a material having high strength at low temperatures and in general a low heat conductivity considerably less than that of ordinary iron or steel. For example, stainless steel or the alloy commonly known as Everdur are well suited to the purpose. The tubular cross section, low heat conductivity and elongated path of travel for the heat combine to produce a support through which heat leakage into the tank and consequently evaporation losses are kept very low. This restriction of heat leakage and evaporation is a matter of considerable economy and importance in the transport of such materials as liquid oxygen. The tubular construction affords the additional advantage of being relatively lightweight for its strength.

The structure also includes preferably a supporting strap or girdle member 26 extending around underneath the bottom of the tank, the upper ends being pierced by the cross member 21. The strap 26 is likewise welded to the cross member 21 and the member 21 is hermetically sealed within the tank 12 by the application of suitable welding. Additional reinforcing plates 27 may be applied to the side of the tank, abutting the strap 26 adjacent where it is pierced by the cross member 21. The strap 26 and plates 27 are preferably secured to the tank surface by brazing or welding.

The front suspension means 18 is shown more clearly in Fig. 4 taken in connection with Fig. 1, and comprises in general shape a triangular structure, including a tubular cross member 30 passing through the opposite sides of the tank walls as shown in Fig. 4, the ends of the cross member being hermetically sealed by welding in the tank where it pierces the walls thereof. A supporting or reinforcing strap or rib 31 extends underneath the tank, the upper ends of this U-shaped member being secured as by welding to the ends of the cross member 30 and the strap being also brazed along its edges to the tank surface. A pair of braces 32 have their respective upper ends secured to the corresponding ends of the strap member 31 adjacent the ends of the cross member 30 and extend downwardly in the form of a V to a common bracket 33 to which they are secured. Welding is employed preferably for securing the braces 32 to the respective parts. The bracket 33 is in turn supported on a complemental bracket 34 which is secured to a cross beam 35 extending between the side rails 11 of the vehicle chassis. The bracket 33 is pivoted or hinged on the bracket 34 by way of the pin 36, which comprises in effect the axis of a pivotal support for the front end of the tank.

The braces 32 and cross member 30 are tubular and comprised of a material like that described above in connection with the rear supporting members, and the braces 32 are also relatively long, resulting in a support well adapted to stand up under the low temperatures and capable of maintaining heat leakage at a minimum.

The outer shell 13 may be supported in any suitable manner, such as by a substantially three-point arrangement similar to that provided for the main tank 12.

The positions of the main supporting means 17 and the auxiliary supporting means 18 relative to the tank and to each other may be varied in accordance with the particular conditions, but the arrangement shown has been found to be particularly advantageous in which the rear supporting means carries approximately three-fourths of the vertical load and the auxiliary front support the remaining one-fourth. Accordingly, the front support with the pivotal connection may be made relatively light weight and the rear supporting means, which is made more substantial and rugged, can appropriately be provided with strong braces, such as those shown, which will assume the forward and rear reactions and, for the major part at least, the side reactions.

In general, the supporting means for the tank comprises a three-point mounting on compression struts. The provision of the braces 23 causes some deviation from a precise three-point suspension means, but in view of the fact that the cross supporting beam for the bottom ends of the braces 23 is not displaced any great distance from the vertical plane of the posts 19, and the further fact that the bottom ends of the braces 23 are brought closely together midway between the side rails 11, the deviation from an exact three-point suspension is not great. In general the tank is relieved of distortion and corresponding stresses resulting from deflections and twisting of the vehicle frame. Also the character of the supports and their connection to the tank are such that the strain imposed on the tank from the vertical loads is distributed over relatively large areas. It will be understood that the tank 12 will have appropriate inner bracing structure and baffles not shown herein since such features form no particular part of the present invention and may vary as to details.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a transport vehicle having a tank for highly volatile liquefied gases mounted longitudinally on the frame thereof, and an outer shell with an insulating space of considerable thickness between the shell and tank, a supporting means near one end comprising a tubular vertical post at each side of the tank connected thereto and extending through said insulating space and an angularly arranged tubular brace for each of said posts extending from near the top of the respective post downwardly and inwardly toward the longitudinal center line of the vehicle and away from the plane of the posts, and a supporting means for the other end of the tank embodying tubular members extending from the tank downwardly through said insulating space and connected at their lower ends to a bracket provided with a pivotal connection to the frame, said tubular posts at each end being of a metal material having a low thermal conductivity and capable of retaining its strength at low temperatures.

2. In a vehicle having a frame with side rails and cross members with a tank for highly volatile liquefied gases mounted thereon and an outer shell forming an intervening insulating space of considerable thickness, a tank supporting post at each side of the vehicle supported on the frame and with their upper ends connected to said tank, and a brace for each of said posts connected to and extending from near the top of the respective post, said braces converging downwardly and inwardly toward each other and connected at their lower ends to a cross member between said side rails at a point spaced longitudinally of the vehicle frame from the plane of the posts transverse to the vehicle, said posts and braces being composed of a material having a low thermal conductivity and capable of retaining its strength at extremely low temperatures.

3. In a vehicle tank structure a pivotal support therefor, comprising a cross member extending through said tank piercing the shell at opposite spaced points, a supporting strap extending underneath said tank between said points, a structural supporting means extending downwardly from said tank at said points, and a pivotal support to the vehicle frame at the lower part of said structural supporting means.

4. In a vehicle tank structure a pivotal support therefor, comprising a cross member extending through said tank piercing the shell at opposite spaced points, the shell being welded to said member at said points to form a hermetical seal, a supporting strap extending underneath said tank between said points, a structural supporting means extending downwardly from said tank at said points, the respective ends of said member and supporting strap and said structural supporting means being rigidly secured together by welding at said points, and a pivotal support to the vehicle frame at the lower part of said structural supporting means.

5. In a vehicle having an oblong tank mounted longitudinally thereon, a main supporting means spaced inwardly from one end, comprising a vertical post at each side of the tank connected to the tank, a cross member connected to said posts and extending through said tank, an angularly arranged brace for each of said posts extending from near the top of the respective post downwardly and inwardly toward the longitudinal center line of the vehicle and away from the plane of the posts transverse to the vehicle, and a second support for the other end of said tank comprising a second cross member extending through said tank, and a structural element secured to the ends of said second cross member, said structural element having a pivotal support to the vehicle frame, the axis of which extends longitudinally of the vehicle, said cross members being hermetically sealed in said tank at the respective junctures with the tank shell.

6. In a vehicle having a tank mounted longitudinally thereon, a main supporting means spaced inwardly from one end, comprising a tubular vertical post at each side of the tank, a tubular cross member secured at its opposite ends to said posts respectively and extending through said tank, an angularly arranged brace for each of said posts extending from near the top of the respective post downwardly and inwardly toward the longitudinal center line of the vehicle and away from the plane of the posts, and a second support for the other end of said tank comprising a structural element secured to the tank closely adjacent said other end and having a pivotal support to the vehicle frame, the axis of which extends longitudinally of the vehicle.

7. In a vehicle having a tank mounted longitudinally thereon, a main supporting means spaced inwardly from one end comprising a tubular vertical post at each side of the tank secured at their upper ends to said tank, an angularly arranged brace for each of said posts extending from near the top of the respective post downwardly and inwardly toward the longitudinal center line of the vehicle and away from the plane of the posts, and a second support for the other end of said tank comprising a pair of tubular members having their upper ends secured to said tank in spaced relation transversely thereof and converging downwardly with their lower ends secured together and provided with a pivotal support to the vehicle frame, the axis of which extends longitudinally of the vehicle.

8. In a vehicle having a tank mounted longitudinally thereon, a main supporting means spaced inwardly from one end comprising a tubular vertical post at each side of the tank secured at their upper ends to said tank, an angularly arranged brace for each of said posts extending from near the top of the respective post downwardly and inwardly toward the longitudinal center line of the vehicle and away from the plane of the posts, and a second support for the other end of said tank comprising a pair of tubular members having their upper ends secured to said tank in spaced relation transversely thereof and converging downwardly with their lower ends secured together and provided with a pivotal support to the vehicle frame, the axis of which extends longitudinally of the vehicle, said vertical posts and tubular members being composed of a metal material having the combined characteristics of a low thermal conductivity and of retaining its toughness and strength at temperatures considerably below 0° centigrade.

9. In a vehicle having a main frame, the combination therewith of an oblong tank for highly volatile liquefied gases mounted on and above said frame extending longitudinally of the vehicle, an outer shell forming an intervening insulating space of considerable thickness extending completely around said tank, and means extending through said space for supporting said tank on said frame comprising a tubular post at each side of the tank toward one end supported on the frame with their upper ends connected to said tank, a brace for each of said posts connected to and extending from near the top of the respective post and inclined downwardly and away from the post to said frame, and supporting members for the opposite end of said tank extending downwardly therefrom connected together at their lower ends and provided with a pivotal support to said frame, said tubular posts and members having a low thermal conductivity and of a material capable of retaining its strength at extremely low temperatures.

10. In a vehicle having a wheeled chassis the combination therewith of an elongated tank for highly volatile liquefied gases mounted longitudinally thereon, an outer shell forming an intervening insulating space of considerable thickness extending completely around said tank, and a substantially 3-point supporting means for supporting said tank on said chassis comprising a pair of tubular vertical posts toward one end spaced apart transversely of said tank with one post at each side thereof having its upper end connected to said tank, and an angular brace for each of said posts, and a support for the other end of said tank comprising a pair of tubular members having their upper ends secured thereto in spaced relation transversely of said tank and converging downwardly with their lower ends secured together, said tubular posts and members extending through said insulating space and being of a construction and material having low thermal conductivity and capable of retaining their strength at extremely low temperatures.

11. In a vehicle having a wheeled chassis the combination therewith of an elongated tank for highly volatile liquefied gases mounted longitudinally thereon, an outer shell forming an intervening insulating space of considerable thickness extending completely around said tank, means for supporting said tank on said chassis comprising a pair of tubular vertical posts toward one end spaced apart transversely of said tank with one post at each side thereof having its upper end connected to said tank, and an angular brace for each of said posts, and a pair of tubular supporting members located toward the opposite end of said tank having their upper ends secured thereto in spaced relation transversely of said tank and extending downwardly from said tank, said tubular posts and members extending through said insulating space and being of a construction and material having low thermal conductivity and capable of retaining substantially their normal strength at temperatures far below 273° K.

ODD A. HANSEN.